(12) United States Patent
Matsumura et al.

(10) Patent No.: US 8,194,735 B2
(45) Date of Patent: Jun. 5, 2012

(54) VIDEO ENCODING APPARATUS AND VIDEO ENCODING METHOD

(75) Inventors: Atsushi Matsumura, Yokohama (JP); Takeshi Chujoh, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1842 days.

(21) Appl. No.: 11/384,483

(22) Filed: Mar. 21, 2006

(65) Prior Publication Data
US 2007/0036213 A1 Feb. 15, 2007

(30) Foreign Application Priority Data
Aug. 12, 2005 (JP) ................................. 2005-234672

(51) Int. Cl.
*H04N 11/04* (2006.01)

(52) U.S. Cl. ......... 375/240.03; 375/240.01; 375/240.02; 375/240.11; 375/240.12; 375/240.13; 375/240.16; 375/240.25; 375/240.26; 375/240.28; 348/397.1; 348/399.1; 348/402; 348/409; 348/424.1; 348/424.2; 348/425.1; 348/425.3; 348/425.4; 348/426.1; 348/441; 348/452

(58) Field of Classification Search ............. 375/240.25, 375/240.26, 240.27, 240.01, 240.02, 240.03, 375/240.11, 240.12, 240.13, 240.16, 240.28; 348/397.1, 399.1, 424.1, 424.2, 425.1, 425.3, 348/425.4, 426.1, 402, 409, 441, 452
See application file for complete search history.

(56) References Cited

U.S. PATENT DOCUMENTS

| | | | | |
|---|---|---|---|---|
| 6,567,471 | B1 * | 5/2003 | Yoshinari | 375/240.26 |
| 6,792,045 | B2 * | 9/2004 | Matsumura et al. | 375/240.1 |
| 6,904,096 | B2 * | 6/2005 | Kobayashi et al. | 375/240.26 |
| 6,996,184 | B2 * | 2/2006 | Hamamatsu et al. | 375/240.25 |
| 7,263,126 | B2 * | 8/2007 | Zhao et al. | 375/240.04 |
| 7,606,433 | B2 * | 10/2009 | Oishi | 382/239 |
| 2005/0157796 | A1 * | 7/2005 | Suzuki | 375/240.24 |
| 2007/0025447 | A1 * | 2/2007 | Kojokaro et al. | 375/240.24 |

FOREIGN PATENT DOCUMENTS

| | | |
|---|---|---|
| JP | 9-326873 | 12/1997 |
| JP | 2003-309803 | 10/2003 |
| JP | 2005-39321 | 2/2005 |

OTHER PUBLICATIONS

Final Notice of Rejection, mailed Mar. 2, 2010, in Japanese Patent Application No. 2005-234672 (3 pages), and English translation thereof (4 pages).
Sakaida et al., "Adaptive Quantization Control for Reducing Flicker of AVC/H.264 Intra Frames," FIT2004 LJ-009 (2004), pp. 225-227.

* cited by examiner

*Primary Examiner* — Leon Flores
(74) *Attorney, Agent, or Firm* — Finnegan, Henderson, Farabow, Garrett & Dunner, L.L.P.

(57) ABSTRACT

A video encoding apparatus provides with a generator to generate a decoded image corresponding to an image obtained by decoding an encoded image obtained by encoding an original image by a first prediction scheme, a selector to select one of the original image and the decoded image as an input image according to a flicker of an image, and an encoder to encode the input image by a second prediction scheme to generate encoded data.

9 Claims, 6 Drawing Sheets

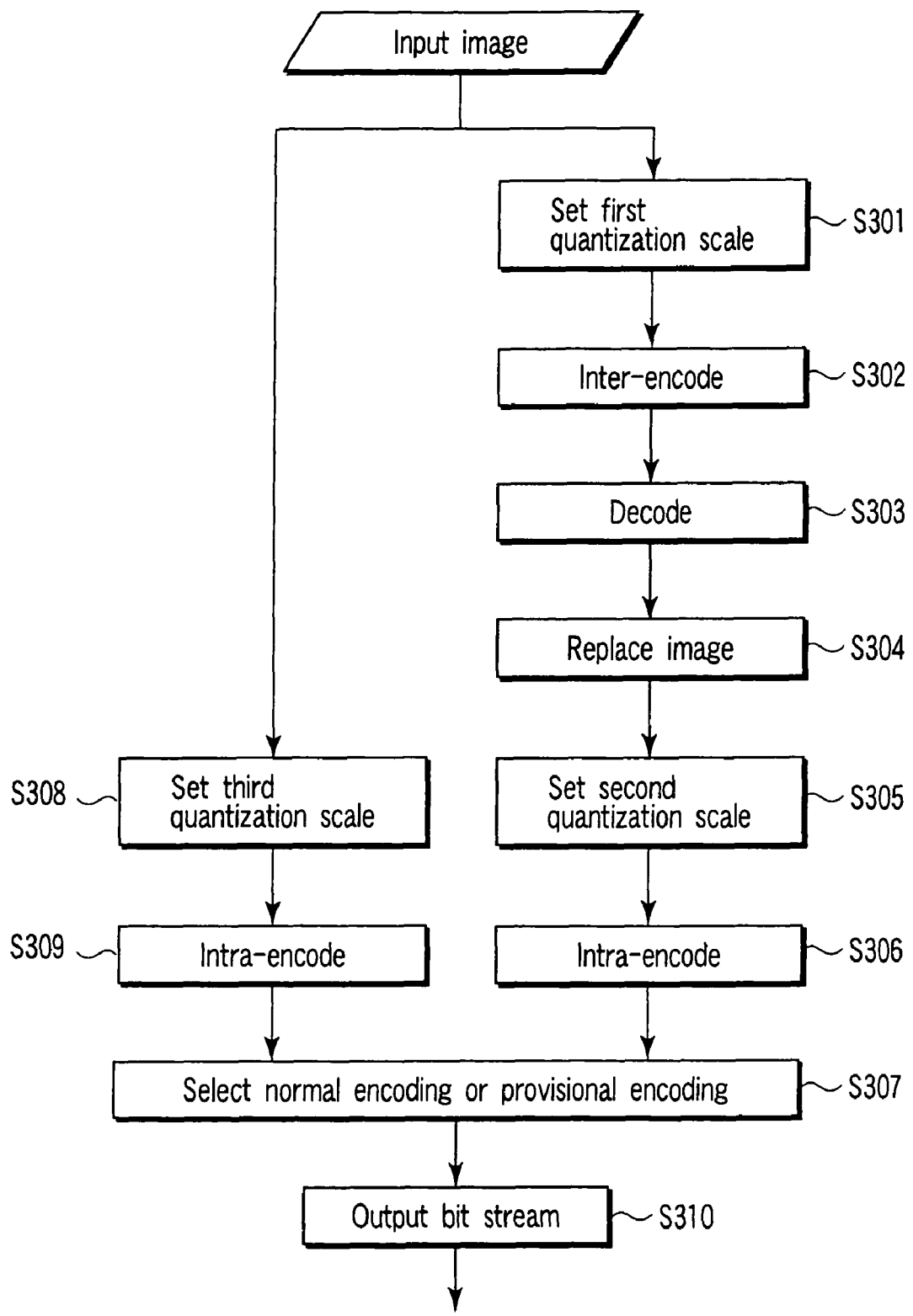
F I G. 5

Flicker occurs due to referring to only I picture causing flicker

No flicker occurs due to referring to both of I and P pictures

VIDEO ENCODING APPARATUS AND VIDEO ENCODING METHOD

CROSS-REFERENCE TO RELATED APPLICATIONS

This application is based upon and claims the benefit of priority from prior Japanese Patent Application No. 2005-234672, filed Aug. 12, 2005, the entire contents of which are incorporated herein by reference.

BACKGROUND OF THE INVENTION

1. Field of the Invention

The present invention relates to a video encoding apparatus and method for replacing an original image with an inter-encoded image and intra-encoding the inter-encoded image to reduce a flicker occurring between the inter-encoding and the intra-encoding.

2. Description of the Related Art

In video encoding, there are intra-encoding using intra-frame prediction (used for I picture mainly) and inter-encoding using inter-frame prediction (used for P/B picture mainly). The intra-encoding and inter-encoding differ in prediction method from each other. Therefore, the distortion due to encoding differs between the intra-encoding and inter-encoding. When images are encoded in order of, for example, I→P→P→P→P→P→P→I→P, the flicker of an image occurs on a screen in P→I. A method for solving this problem is already proposed in "Adaptive Quantization control for Reducing Flicker of AVCH.264 Intra Frames," FIT2004LJ-009. This method controls an encoding parameter such that the encoding distortion of an encoded I picture is nearest to the predictive encoding distortion of a to-be-encoded I picture. However, the above method contains a problem that the flicker of an image can reduce only a scene containing a little movement. Actually, the flicker occurs due to the scene which a screen pans or the difference between the encoding distortions of I picture and P/B picture even if the scene contains movement of some extent.

As described above, there is a problem that the flicker can be reduced for only a scene containing a little movement.

The present invention is to provide a video encoding apparatus and method for encoding an image to be intra-encoded by inter-encoding at first and encoding a decoded image of the inter-encoded image by intra-encoding again, to reduce a flicker in every scene as well as a scene containing a little movement.

BRIEF SUMMARY OF THE INVENTION

An aspect of the present invention provides a video encoding apparatus comprises: a generator to generate a decoded image corresponding to an image obtained by decoding an encoded image obtained by encoding an original image by a first prediction scheme; a selector to select one of the original image and the decoded image as an input image according to a flicker of an image; and an encoder to encode the input image by a second prediction scheme to generate encoded data.

BRIEF DESCRIPTION OF THE SEVERAL VIEWS OF THE DRAWINGS

FIG. 5 is a flow chart for explaining operation of the video encoding apparatus related to the third embodiment of the present invention.

DETAILED DESCRIPTION OF THE INVENTION

There will be explained an embodiment of the present invention hereinafter.

First Embodiment

Figure 1:
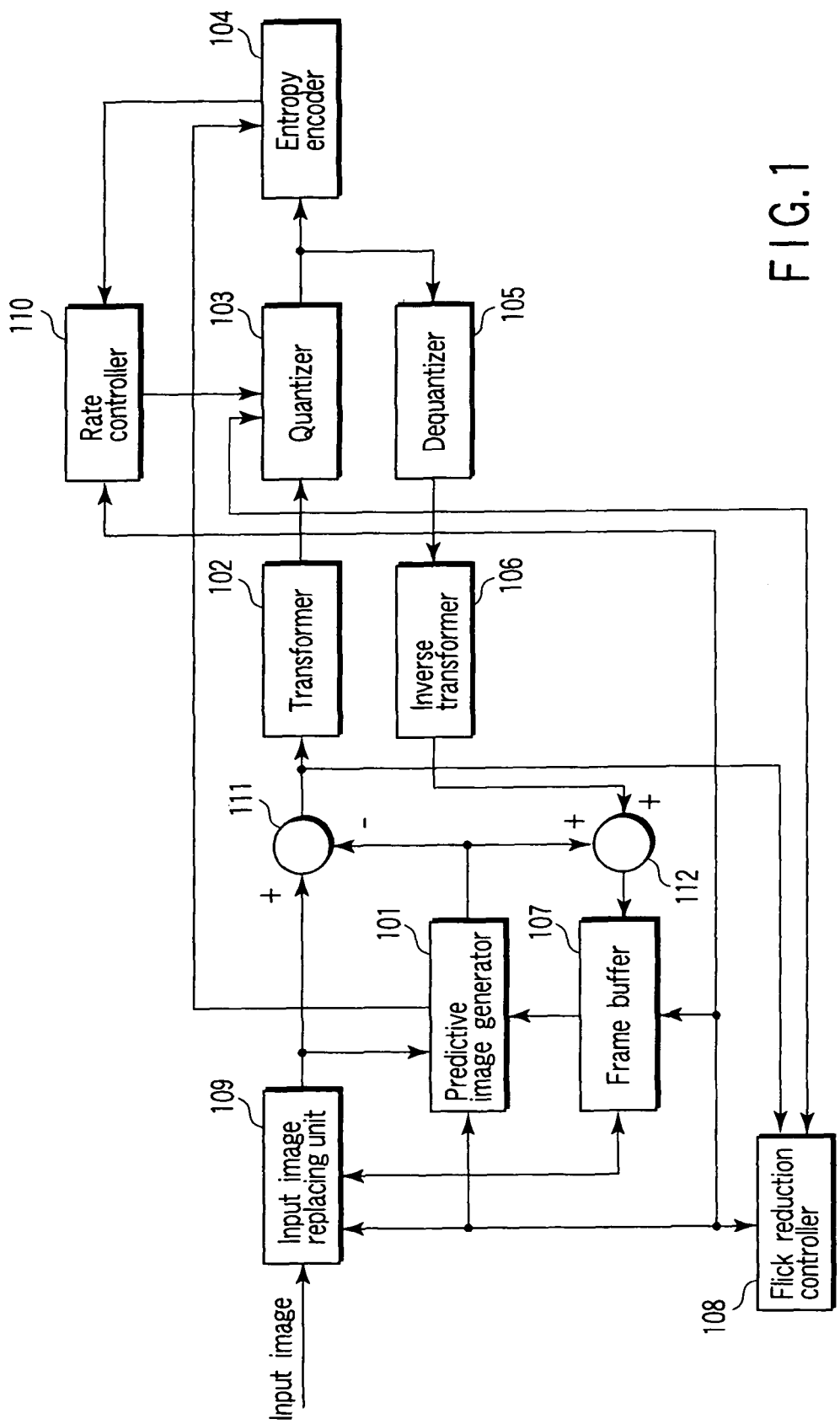
FIG. 1 is a block diagram of a video encoding apparatus related to first and second embodiments of the present invention.

FIG. 1 is a block diagram of a video encoding apparatus related to the first embodiment of the present invention.

According to the video encoding apparatus of the first embodiment, a predictive image generator 101 generates a predictive image from an input image. The output of the predictive image generator 101 is connected to a transformer (orthogonal transformer) 102 through a subtracter 111. This transformer 102 transforms a residual error signal between the input image and the predictive image from the subtracter 111 into a coefficient (for example, DCT coefficient, DCT coefficient of integer precision or a coefficient to be provided by discrete Hadamard transformation). The output of the transformer 102 is connected to a quantizer 103 for quantizing the coefficient. The output of the quantizer 103 is connected to an entropy encoder 104. The entropy encoder 104 entropy-encodes the quantized coefficient and information (for example, motion vector and block shape) needed for generating the predictive image.

The output of the quantizer 103 is connected to a dequantizer 105 which dequantizes the quantized coefficient. The output of the dequantizer 105 is connected an inverse transformer 106 for subjecting the dequantized coefficient to inverse-transformation (inverse discrete cosine transformation (IDCT)). The output of the inverse transformer 106 is connected to a frame buffer 107 through an adder 112. The frame buffer 107 stores a decoded image provided by adding the inverse-transformed signal of the inverse transformer 106 and the predictive image output from the predictive picture generator 101.

The output of the frame buffer 107 is connected to a flicker reduction controller 108 and an input image replacing unit 109. The flicker reduction controller 108 determines whether the flicker should be reduced based on the residual error signal from the subtracter and the quantized signal of the quantizer 103, and outputs a control signal according to a determination result to an input image replacing unit 109. The input image replacing unit 109 replaces the input image with a decoded image stored in the frame buffer 107 according to a control signal of the flicker reduction controller 108.

The flicker reduction controller 108 controls the predictive picture generator 101, the frame buffer 107, the quantizer 103 and the control rate controller 110 as well as the input image replacing unit 109. The rate controller 110 receives the number of encoded bits generated by the entropy encoder 104, calculates a quantization scale to control a bit rate, and sets it to the quantizer 103.

Figure 2:
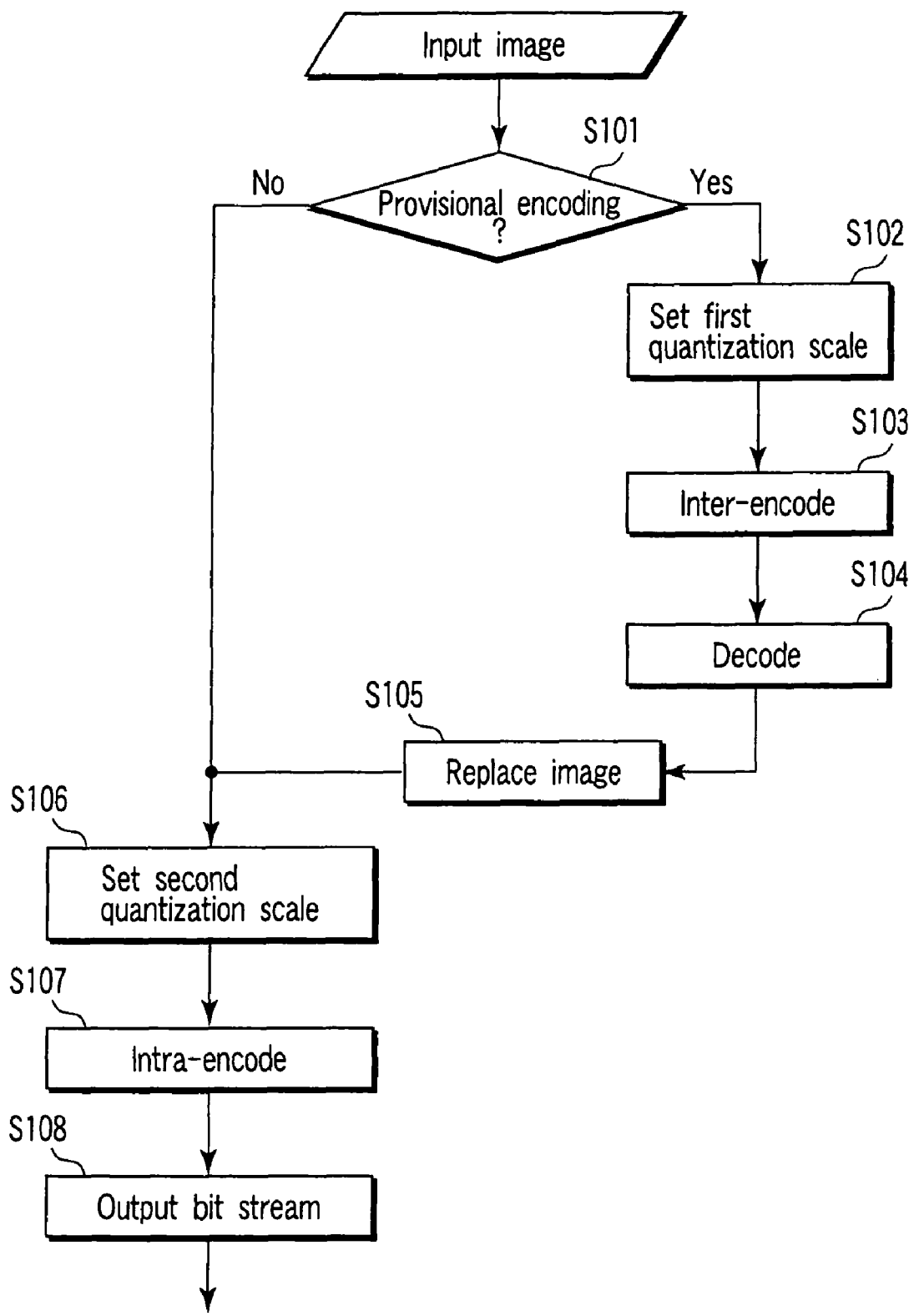
FIG. 2 is a flow chart for explaining operation the video encoding apparatus related to the first embodiment of the present invention.

There will now be described the operation of the video encoding apparatus related to the first embodiment in conjunction with a flow chart of FIG. 2.

The flicker reduction controller 108 determines whether the flicker should be reduced (S101). In this time, for example, the predictive image generator 101 calculates a motion vector between the input image and the reference image, and the flicker reduction controller 108 receives the motion vector information and calculates the size of the motion vector.

The flicker reduction controller 108 determines the flicker when it detects at least one of the following conditions.

The motion vector is smaller than a threshold,
The quantization scale calculated by the rate controller 110 is larger than a threshold.
The variance value is larger than a threshold, the variance value being obtained by calculating variance of the input image input from the input image replacing unit 109 with the flicker reduction controller 108.

The flicker reduction controller 108 receives a residual error signal between an input image signal and a predictive image signal produced with the predictive image generator 101 to calculate an absolute value sum of the predictive image signals, a square sum thereof, variance thereof or an average thereof. When the average is smaller than a threshold, the flicker reduction controller 108 determines to reduce the flicker. When the reduction of the flicker is determined, the process advances to a process flow for provisionally encoding the input image signal (S102). When it is determined that the flicker is not reduced, the process advances to a process flow for encoding the input image signal (S106).

When the provisional encoding is selected, the flicker reduction controller 108 calculates the first quantization scale and sets it to the quantizer 103 (S102). This first quantization scale uses the following average of the quantization scales:

the average of the quantization scales obtained when the quantizer 103 quantizes the image before N images in displaying order or before N images in encoding order, and stored and averaged in the flicker controller 108, the average of the quantization scales obtained when the quantizer 103 quantizes the image currently encoded, and stored and averaged in the flicker controller 108, or the average of the quantization scales obtained when the quantizer 103 quantizes N images (I/P pictures) nearest to the display time or encoding time and becoming the reference images and stored and averaged in the flicker controller 108.

The input image is inter-encoded (S103). In this case, a predictive image is generated from the input image and some reference images by the predictive image generator 101. A residual error signal between the input image and the predictive image is transformed into a coefficient with the transformer 102. The transformed coefficient is quantized with the quantizer 103 using the first quantization scale.

The quantized coefficient is dequantized with the dequantizer 105. The dequantized coefficient is inverse-transformed with the inverse-transformer 106. A decoded image signal is produced by adding the predictive image signal output from the predictive image generator 101 and the inverse-transformed signal and stored in the frame buffer 107 (S104). The input image replacing unit 109 receives the input image signal with the decoded image (S105).

Thereafter, the process shifts to steps S106 to S108 for encoding the input image signal. In this case, the flicker reduction controller 108 calculates a second quantization scale used for actual encoding, and sets it to the quantizer 103. This second quantization scale uses the following value, i.e., a value calculated with the rate controller 110, a value obtained by multiplying the first quantization scale calculated with the flicker reduction controller 108 by a ratio of less than or equal to 100%, or a value of a maximum quantization scale by which the encoding distortion is reduced less than a threshold. In other words, the input image signal is quantized with the quantizer 103, the quantized coefficient is dequantized with the dequantizer 105, and the dequantized coefficient is inverse-transformed with the inverse transformer 106. A decoded image signal is produced by adding the predictive image signal output from the predictive image generator 101 and the inverse-transformed signal with the adder 112. The decoded image is stored in the frame buffer 107. The flicker reduction controller 108 calculates the encoding distortion based on the decoded image of the frame buffer 107 and the input image signal from the input image replacing unit 109. The flicker reduction controller 108 calculates the maximum quantization scale by which the encoding distortion is reduced less than the threshold. In this case, the second quantization scale is made less than the first quantization scale.

The encoding distortion is obtained by the sum of differential signals between the original image and the object image to be compared, the absolute value sum, the square sum, an average, variance, $$SNR\left(10 \times \log_{10}\left(\frac{\text{variance of original image}}{\text{variance of error signal}}\right)\right)$$

or $$PSNR\left(10 \times \log_{10}\left(\frac{255 \times 255}{\text{variance of error signal}}\right)\right)$$

The predictive image generator 101 generates a predictive image from the input image. The transformer 102 transforms the residual error signal between the input image and the predictive image into a coefficient. The coefficient is quantized with the quantizer 103 using the second quantization scale. The input image signal is intra-encoded based on the quantized coefficient (S107).

The entropy encoder (104) receives the intra-encoded image information from the quantizer 103 and the predictive image generator 101, and entropy-encode it to output a bit stream (S108). The process of the flicker reduction controller 108 is done in units of macroblock, in units of video packet, in units of slice or in units of picture.

Second Embodiment

Figure 3:
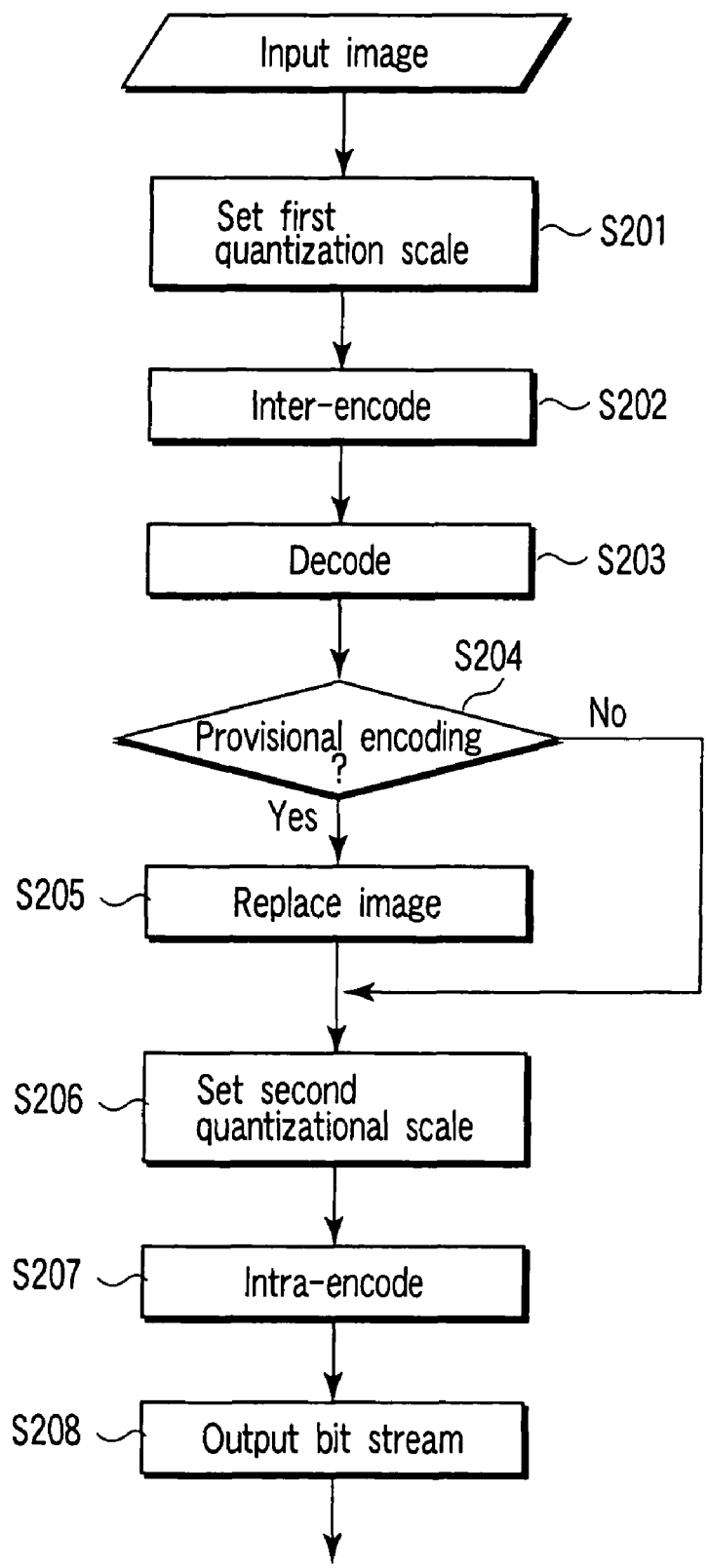
FIG. 3 is a flow chart for explaining operation of the video encoding apparatus related to the second embodiment of the present invention.

A video encoding apparatus related to the second embodiment of the present invention will be described referring to FIGS. 1 and 3. FIG. 3 is a flow chart for explaining the operation of the video encoding apparatus related to the second embodiment of the present invention.

In FIG. 3, at first the flicker reduction controller 108 calculates a first quantization scale and sets it to the quantizer 103 (S201). This first quantization scale uses the following value, i.e., an average of the quantization scales obtained when the quantizer 103 quantizes the image before N images in displaying order or before N images in encoding order, and stored and averaged in the flicker controller 108, an average of the quantization scales obtained when the quantizer 103 quantizes the image currently encoded, and stored and averaged in the flicker controller 108, an average of the quantization scales obtained when the quantizer 103 quantizes N images (I/P pictures) nearest to the display time or encoding time and becoming the reference images, and stored and averaged in the flicker controller 108, or a value calculated with the rate controller 110.

The predictive image generator 101 generates a predictive image from the input image, and the transformer 102 transforms a residual error signal between the input image and the predictive image into a coefficient. The quantizer 103 quantizes the coefficient using the first quantization scale to inter-encode the input image (S202).

The dequantizer 105 dequantizes the quantized coefficient. The dequantized coefficient is inverse-transformed with the inverse transformer 106. A decode image signal is generated by adding the inverse-transformed signal and the predictive image output from the predictive image generator 101 and stored in the frame buffer 107 (S203).

The flicker reduction controller 108 determines whether the flicker should be reduced (S204). The flicker reduction controller 108 determines flicker reduction when any one of the following conditions, for example, is satisfied.

(A) When the size of a motion vector between the input image and the reference image is smaller than a threshold. This "motion vector" may be calculated with the predictive image generator 101. Further, the "size of the motion vector" may be calculated with the flicker reduction controller 108.

(B) When the quantization scale calculated with the rate controller 110 is larger than a threshold.

(C) When variance of the input image is larger than a threshold. The "variance of the input image" may be calculated with the flicker reduction controller 108 which receives the input image from the input image replacing unit 109.

(D) When the absolute value sum of residual error signals between the input image and the predictive image, the square sum, variance or average is smaller than a threshold. This "predictive image" may be made with the predictive image generator 101. The "absolute value sum", "square sum", "variance" or "average" may be calculated with the flicker reduction controller 108.

(E) When the encoding distortion is smaller than a threshold. The encoding distortion is calculated by the flicker reduction controller 108 based on the decoded image and the input image received from the frame buffer 107 and the input image replacing unit 109.

The encoding distortion is obtained by the sum of differential signals between the original image and the object image to be compared, the absolute value sum, the square sum, an average, variance, $$SNR\left(10 \times \log_{10}\left(\frac{\text{variance of original image}}{\text{variance of error signal}}\right)\right)$$

or $$PSNR\left(10 \times \log_{10}\left(\frac{255 \times 255}{\text{variance of error signal}}\right)\right)$$

When the flicker reduction controller 108 determines reduction of the flicker, the process advances to step S205 for replacing the input image. When the flicker reduction controller 108 determines non-reduction of the flicker, the process shifts to steps S206 to S208 for encoding the input image.

When the image is replaced, the input image replacing unit 109 reads out the decoded image from the frame buffer 107 and replaces the input image with the decoded image (S205). The process advances to step S206 for encoding the input image.

The flicker reduction controller 108 calculates the second quantization scale used for actual encoding and sets it to the quantizer 103 (S206). This second quantization scale is set to the following value, i.e., a value calculated with the rate controller 110, a value obtained by multiplying the first quantization scale calculated with the flicker reduction controller 108 by a ratio of less than or equal to 100%, or a value of a maximum quantization scale by which the encoding distortion reduces less than a threshold. The coefficient quantized with the quantizer 103 is dequantized with the dequantizer 105 and the dequantized coefficient is inverse-transformed with the inverse-transformer 106 to obtain an inverse transformed signal. A decoded image is produced by adding the inverse-transformed signal and the predictive image output from the predictive image generator 101, and stored in the frame buffer 107.

The flicker reduction controller 108 receives the decoded image of the frame buffer 107 and the input image from the input image replacing unit 109 to calculate encoding distortion, and calculates a maximum quantization scale by which the encoding distortion is reduced less than a threshold. However, the second quantization scale is made less than the first quantization scale. The process of the flicker reduction controller 108 is done in units of macroblock, in units of video packet, in units of slice or in units of picture.

The predictive image generator 101 generates a predictive image from the input image. The residual error signal between the input image and the predictive image is transformed into a coefficient by the transformer 102. The coefficient is quantized with the quantizer 103 using the second quantization scale. As a result, the input image is intra-encoded (S207). The entropy encoder 104 receives the intra-encoded information from the quantizer 103 and predictive image generator 101 to entropy-encode it, and outputs a bit stream (S208).

The second embodiment of the present invention carries out provisional encoding indispensably, so that quantity of operation increases in comparison with the first embodiment. However, since information used by the flicker reduction controller 108 to determine whether a flicker should be reduced increases by provisional encoding, determination precision can be improved.

Third Embodiment

A video encoding apparatus related to the third embodiment of the present invention is described in conjunction with FIGS. 4 and 5 hereinafter. In the third embodiment, like reference numerals are used to designate like structural elements corresponding to those like in FIG. 1 and any further explanation is omitted for brevity's sake.

Figure 4:
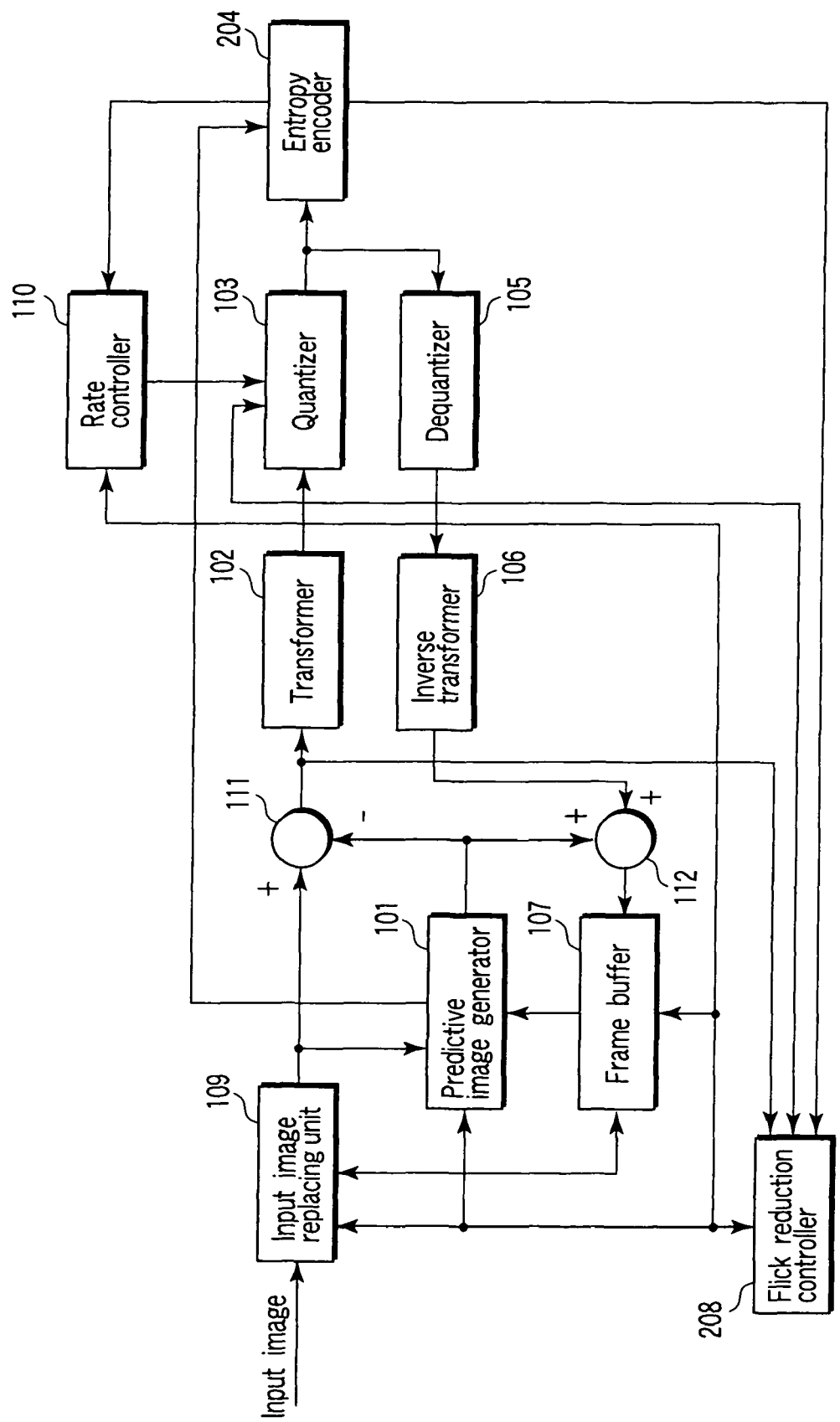
FIG. 4 is a block diagram of a video encoding apparatus related to a third embodiment of the present invention.

The video encoding apparatus of FIG. 4 differs from FIG. 1 in the point that the flicker controller 208 controls the entropy encoder 204. FIG. 5 is a flow chart for explaining the operation of the video encoding apparatus of the third embodiment.

The input image is introduced to a process flow (S308 to S309) for encoding ordinarily the input image and a process flow (S301 to S306) for encoding provisionally the input image. Both of the process flows may be executed in parallel or in serial. At first, the process flow for provisionally encoding the image will be described hereinafter.

The flicker reduction controller 208 calculates the first quantization scale and sets it to the quantizer 103 (S301). This first quantization scale is set to the following value, i.e., an average of the quantization scales obtained when the quantizer 103 quantizes the image before N images in displaying order or before N images in encoding order, and stored and averaged in the flicker reduction controller 208, an average of the quantization scales obtained when the quantizer 103 quantizes the image currently encoded, and stored and averaged in the flicker reduction controller 208, an average of the quantization scales obtained when the quantizer 103 quantizes N images (I/P pictures) nearest to the display time or encoding time and becoming the reference images and stored and averaged in the flicker reduction controller 208, or a value calculated with the rate controller 110.

The predictive image generator 101 generates a predictive image from the input image, and the transformer 102 transforms a residual error signal between the input image and the predictive image into a coefficient. The coefficient is quantized with the quantizer 103 using the first quantization scale. As a result, the input image is inter-encoded (S302).

The quantized coefficient is dequantized with the dequantizer 105. The dequantized coefficient is inverse-transformed with the inverse-transformer 106. A decoded image signal is produced by adding the predictive image signal output from the predictive image generator 101 and the inverse-transformed signal and stored in the frame buffer 207 (S303).

When the image is replaced, the input image replacing unit 109 reads out the decoded image from the frame buffer 107 and replaces the input image with the decoded image (S304). The flicker reduction controller 208 calculates the second quantization scale used for encoding really and sets it to the quantizer 103 (S305). This second quantization scale is set to the following value, i.e., a value calculated with the rate controller 110, a value obtained by multiplying the first quantization scale calculated with the flicker reduction controller 108 by a ratio of less than or equal to 100%, or a maximum value by which the encoding distortion reduces less than a threshold.

The coefficient quantized with the quantizer 103 is dequantized with the dequantizer 105 and the dequantized coefficient is inverse-transformed with the inverse-transformer 106 to obtain an inverse transformed signal. A decoded image signal is produced by adding the predictive image signal output from the predictive image generator 101 and the inverse-transformed signal, and stored in the frame buffer 107.

The flicker reduction controller 208 calculates the encoding distortion based on the decoded image of the frame buffer 107 and the input image signal from the input image replacing unit 109. Further, the flicker reduction controller 208 calculates a maximum quantization scale by which the encoding distortion is reduced less than the threshold. However, the second quantization scale is made less than the first quantization scale.

The encoding distortion is obtained by the sum of differential signals between the original image and the object image to be compared, the absolute value sum, the square sum, an average, variance, $$SNR\left(10 \times \log_{10}\left(\frac{\text{variance of original image}}{\text{variance of error signal}}\right)\right)$$

or $$PSNR\left(10 \times \log_{10}\left(\frac{255 \times 255}{\text{variance of error signal}}\right)\right)$$

The predictive image generator 101 generates a predictive image from the input image. The transformer 102 transforms the residual error signal between the input image and the predictive image into a coefficient. The coefficient is quantized with the quantizer 103 using the second quantization scale. As a result, the input image signal is intra-encoded (S306). The encoded image is stored in the flicker reduction controller 208 as a provisional encoded image A.

The process flow for encoding ordinarily the input image is explained hereinafter. The third quantization scale is calculated and set to the quantizer 103 (S308). This third quantization scale is calculated with the rate controller 110, for example, and set to the quantizer 103.

The predictive image generator 101 generates a predictive image from the input image, and the transformer 102 transforms a residual error signal between the input image and the predictive image into a coefficient. The quantizer 103 inter-encodes the input image by quantizing the coefficient according to the third quantization scale (S309). The encoded image is stored in the flicker reduction controller 208 as an ordinarily encoded image B.

The flicker reduction controller 208 determines whether the flicker should to be reduced (S307). In this time, the predictive image generator 101 calculates a motion vector between the input image and the reference image. The flicker reduction controller 208 determines to reduce the flicker on one or more the following conditions:

when the size of motion vector calculated from received motion vector information is less than a threshold;

when the quantization scale calculated with the rate controller 110 is more than a threshold;

when the first quantization scale calculated with the flicker reduction controller 208 is more than a threshold;

when a value of variance of the input image which is calculated with the flicker reduction controller 208 received the input image from the input image replacing unit 109 is more than a threshold, when an absolute value sum, a square sum, a variance or an average is less than a threshold, each parameter being calculated with the flicker reduction controller 208 based on a residual error signal between the input image and the predictive image generated with the predictive image generator 101;

when encoding distortion is less than a threshold, the encoding distortion being calculated with the flicker reduction controller 208 to which the decoded image A of the provisional encoded image A and the decoded image B of the ordinarily encoded image B are input together with the input image from the input image replacing unit 209, the decoded images A and B each being produced by adding the inverse-transformed signal from the inverse-transformer 106 and the predictive image from the predictive image generator 101; or when each encoding distortion difference is more than a threshold.

When it is determined that the flicker is reduced, the flicker reduction controller 208 sends the provisional encoded image A to the entropy encoder 104. When it is determined that the flicker is not reduced, the flicker reduction controller 208 sends the ordinarily encoded image B to the entropy encoder 104. The entropy encoder 104 receives intra-encoded information from the flicker reduction controller 208 and entropy-encodes it to output a bit stream (S310). The process of the flicker reduction controller 208 is done in units of macroblock, in units of video packet, in units of slice or in units of picture.

Since the third embodiment executes both of a serial encoding process (S301 to S306) for reducing the flicker and an ordinal encoding process (S308, S309), the quantity of operation increases in comparison with the first or second embodiment of the present invention. However, information used with the flicker reduction controller 208 for determining whether the flicker should be reduced is determined based on the ordinary encoding result and the encoding result of reducing the flicker, so that the determination precision can be improved.

As thus described, according to the video encoding apparatus related to the first to third embodiments, at first an image to be encoded by intra-encoding (I picture) is encoded by inter-encoding (P/B picture), and then the decoded image of the inter-encoded image is intra-encoded. As a result, it is possible to reduce the flicker in every scene.

In the above embodiments, the process for reducing the flicker in the intra-encoding is explained. However, the present invention is not limited to reducing the flicker in the intra-encoding. There is a case that the flicker occurs between inter-encoding and inter-encoding, too. In an example shown in FIG. 6A, P3 picture is predicted from B1 and B2 pictures and I0 picture. Therefore, the flicker does not occur. In contrast, since B4, B5 pictures are predicted from the I6 picture causing the flicker, the flicker occurs. In such a case, the intra-encoding process in the embodiment is changed to the inter-encoding process, and the flicker reduction controller 108 makes the predictive image generator 101 change a prediction structure at the time of executing provisional encoding by inter-encoding. As a result, the problem of the flicker can be solved.

Figure 6A:
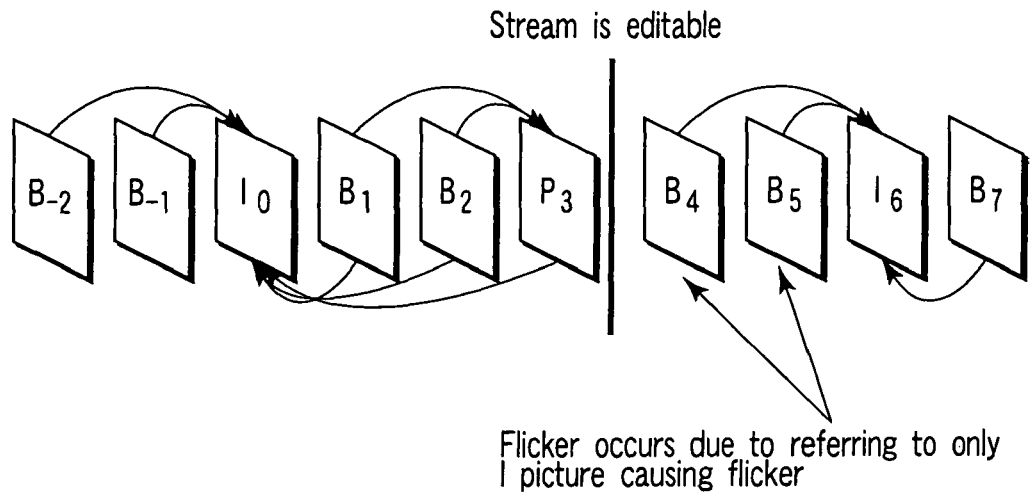
FIGS. 6A and 6B are diagrams indicating a factor causing a flicker in a B picture.
Figure 6B:
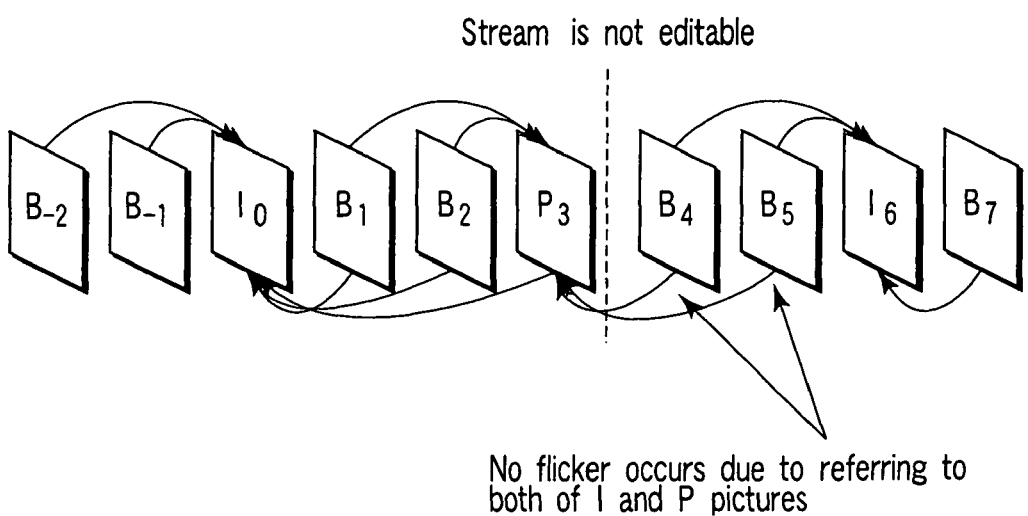

In the case of FIG. 6A, B4 picture is predicted from P3 picture, stream editing is enabled between both pictures. In the case of FIG. 6B, B4 and B5 pictures are predicted by I6 and P3 pictures, the flicker does not occur. Accordingly, in this case, it is not necessary to make the predictive image generator 101 change a prediction structure. However, in the example of FIG. 6B, the stream editing cannot be carried out between P3 picture and B4 pictures.

This video encoding apparatus can be realized by using general-purpose computer equipment as basic hardware. In other words, the predictive image generation, transformation/inverse-transformation, quantization/dequantization, entropy encoding, frame buffering, input image replacing and determination of flicker reduction can be executed by program installed in the computer equipment. In this time, the video encoding apparatus may realized by installing the program in the computer equipment beforehand, and by installing the program stored in a storage medium such as a compact disk-read only memory or distributed via a network in the computer equipment appropriately.

Further, it can be realized by using appropriately a memory and a hard disk built in or externally mounted on the computer equipment or a storage medium such as CD-R, CD-RW, DVD-RAM, DVD-R.

According to the present invention, since intra-encoding (I picture) has property similar to the image encoded as inter-encoding (P/B picture) first, it is possible to reduce the flicker in every scene.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A video encoding apparatus comprising:
a generator to generate a decoded image corresponding to an image obtained by decoding an encoded image obtained by encoding an original image by a first prediction scheme;
a selector to select one of the original image and the decoded image as an input image according to a flicker condition; and
an encoder to encode the input image by a second prediction scheme to generate encoded data,
wherein when a size of a motion vector between the original image and the decoded image used as a reference image is less than a threshold, the condition for reducing the flicker is satisfied.

2. A video encoding apparatus comprising:
a generator to generate a decoded image corresponding to an image obtained by decoding an encoded image obtained by encoding an original image by a first prediction scheme;
a selector to select one of the original image and the decoded image as an input image according to a flicker condition;
an encoder to encode the input image by a second prediction scheme to generate encoded data; and
a determination unit configured to determine whether a condition for reducing the flicker is satisfied, by using one of an encoding parameter used in the encoder, the original image and the decoded image, and wherein the selector selects the original image as the input image when the determination unit determines to fail to satisfy the condition for reducing the flicker, and selects the decoded image as the input image when the determination unit determines to satisfy the condition,
wherein when a size of a first quantization scale used for obtaining an encoded image by encoding an original image by the first prediction scheme or a size of a second quantization scale used for encoding the input image by the second prediction scheme is more than a threshold, the condition for reducing the flicker is satisfied.

3. A video encoding apparatus comprising:
a generator to generate a decoded image corresponding to an image obtained by decoding an encoded image obtained by encoding an original image by a first prediction scheme;
a selector to select one of the original image and the decoded image as an input image according to a flicker condition;
an encoder to encode the input image by a second prediction scheme to generate encoded data; and
a determination unit configured to determine whether a condition for reducing the flicker is satisfied, by using one of an encoding parameter used in the encoder, the original image and the decoded image, and wherein the selector selects the original image as the input image when the determination unit determines to fail to satisfy the condition for reducing the flicker, and selects the decoded image as the input image when the determination unit determines to satisfy the condition,
wherein when a variance of the original image or the decoded image is more than a threshold, the condition for reducing the flicker is satisfied.

4. A video encoding apparatus comprising:
a generator to generate a decoded image corresponding to an image obtained by decoding an encoded image obtained by encoding an original image by a first prediction scheme;
a selector to select one of the original image and the decoded image as an input image according to a flicker condition;
an encoder to encode the input image by a second prediction scheme to generate encoded data; and a determination unit configured to determine whether a condition for reducing the flicker is satisfied, by using one of an encoding parameter used in the encoder, the original image and the decoded image, and wherein the selector selects the original image as the input image when the determination unit determines to fail to satisfy the condition for reducing the flicker, and selects the decoded image as the input image when the determination unit determines to satisfy the condition, wherein when one of an absolute value sum of residual error signals due to motion compensation between the decoded image and the reference image, a square sum, a variance, or an average is less than a threshold, the condition for reducing the flicker is satisfied.

5. A video encoding apparatus comprising:

a generator to generate a decoded image corresponding to an image obtained by decoding an encoded image obtained by encoding an original image by a first prediction scheme;

a selector to select one of the original image and the decoded image as an input image according to a flicker condition;

an encoder to encode the input image by a second prediction scheme to generate encoded data; and a determination unit configured to determine whether a condition for reducing the flicker is satisfied, by using one of an encoding parameter used in the encoder, the original image and the decoded image, and wherein the selector selects the original image as the input image when the determination unit determines to fail to satisfy the condition for reducing the flicker, and selects the decoded image as the input image when the determination unit determines to satisfy the condition, wherein when encoding distortion of an image corresponding to an image obtained by decoding an encoded image obtained by encoding the decoded image by the second prediction scheme is less than a threshold, the condition for reducing the flicker is satisfied.

6. A video encoding apparatus comprising:

a generator to generate a decoded image corresponding to an image obtained by decoding an encoded image obtained by encoding an original image by a first prediction scheme;

a selector to select one of the original image and the decoded image as an input image according to a flicker condition;

an encoder to encode the input image by a second prediction scheme to generate encoded data; and a determination unit configured to determine whether a condition for reducing the flicker is satisfied, by using one of an encoding parameter used in the encoder, the original image and the decoded image, and wherein the selector selects the original image as the input image when the determination unit determines to fail to satisfy the condition for reducing the flicker, and selects the decoded image as the input image when the determination unit determines to satisfy the condition, wherein one of an average of a difference between a first encoding distortion and a second encoding distortion, an average of an absolute value, a variance, a variance of an absolute value, an absolute value sum, and a square sum is more than a threshold, the condition is satisfied, the first encoding distortion being encoding distortion of an image corresponding to an image obtained by decoding an encoded image obtained by encoding the original image by the second prediction scheme and the second encoding distortion being encoding distortion of an image corresponding to an image obtained by decoding an encoded image obtained by encoding the decoded image by the second prediction scheme.

7. A video encoding apparatus comprising:

an encoder to generate a first encoded image obtained by encoding an original image by a first prediction scheme and a second encoded image generated by encoding a first decoded image by the first prediction scheme, the first decoded image obtained by decoding an encoded image obtained by encoding the original image by a second prediction scheme;

a comparator to compare the original image with each of the first decoded image and a second decoded image obtained by decoding the first encoded image about an encoding distortion; and an output unit configured to output one of the first encoded image and the second encoded image according to the encoding distortion.

8. A video encoding method comprising:

generating a first encoded image obtained by encoding an original image by a first prediction scheme and a second encoded image obtained by encoding a first decoded image by the first prediction scheme, the first decoded image obtained by decoding an encoded image obtained by encoding the original image by a second prediction scheme;

comparing the original image with each of the first decoded image and a second decoded image obtained by decoding the first encoded image about an encoding distortion; and outputting one of the first encoded image and the second encoded image according to the encoding distortion.

9. A non-transitory computer-readable storage medium storing instructions of a computer program which, when executed by a computer, causes the computer to perform a method comprising:

generating a first encoded image obtained by encoding an original image by a first prediction scheme and a second encoded image obtained by encoding a first decoded image by the first prediction scheme, the first decoded image obtained by decoding an encoded image obtained by encoding the original image by a second prediction scheme;

comparing the original image with each of the first decoded image and a second decoded image obtained by decoding the first encoded image about an encoding distortion; and outputting one of the first encoded data and the second encoded data according to the encoding distortion.

* * * * *